United States Patent [19]

Keating

[11] Patent Number: 4,481,873
[45] Date of Patent: Nov. 13, 1984

[54] DEEP FAT FRYER WITH EXTENDED HEAT TRANSFER TUBES

[76] Inventor: Richard T. Keating, 144 N. Cuyler, Oak Park, Ill. 60302

[21] Appl. No.: 493,432

[22] Filed: May 11, 1983

[51] Int. Cl.³ .............................................. A47J 37/12
[52] U.S. Cl. ..................................... 99/403; 219/315; 126/391
[58] Field of Search .......................... 99/403, 407, 408; 122/44 R, 135 R; 126/391; 219/315, 421, 437

[56] References Cited

U.S. PATENT DOCUMENTS

| | | | |
|---|---|---|---|
| 2,550,758 | 5/1951 | Bemis | 99/407 X |
| 4,041,852 | 8/1977 | Keating | 99/403 |
| 4,169,225 | 9/1979 | Rickert et al. | 219/437 X |

FOREIGN PATENT DOCUMENTS

| | | | |
|---|---|---|---|
| 910815 | 6/1946 | France | 219/438 |
| 2306663 | 11/1976 | France | 99/403 |

*Primary Examiner*—Billy J. Wilhite
*Assistant Examiner*—Christine A. Peterson

[57] ABSTRACT

An instant recovery deep fat fryer includes a vessel having a cooking section, of minimized surface area and volume above a heating section arranged for high heat transfer from a plurality of heat exchange tubes. The heating section has inclined extensions that accommodate the heat exchange tubes, which extend beyond the boundary of the cooking section.

5 Claims, 5 Drawing Figures

DEEP FAT FRYER WITH EXTENDED HEAT TRANSFER TUBES

BACKGROUND OF THE INVENTION AND PRIOR ART

This invention relates generally to deep fat fryers for cooking foods and particularly to deep fat fryers of the so-called "instant recovery" type.

It is well known that in cooking foods in deep fat fryers, the amount of fat absorbed by the food and the rate of heat absorption have marked effects on the taste, appearance and quality of the cooked food and on the useful life of the cooking fat. Prior to the development of the instant recovery deep fat fryer in the 1950's, it was customary to maintain a large volume of "working fat" at sufficiently high temperature to meet the peak demands of foods having the greatest heat requirements to avoid producing "greasy" fried foods caused by the existence of large temperature gradients in the fat during cooking.

The instant recovery fryer essentially eliminated the recovery time portion of the prior art cycle which was divided into pre-heat time, frying time and recovery time to bring the fat back to frying temperature. With the instant recovery fryer, the cooking fat was brought back to frying temperature at the end of the frying time.

The instant recovery deep fat fryer enabled an increase in the then standard 8.86° F. per minute fat heat-up rate to as much as 56° F. per minute, without damage to the fat, provided there was a proper minimization of non-working fat. The smaller amount of fat in the fryer yielded a great improvement in fat economy. Working the fat at a more uniform temperature and exposing less fat to the atmosphere also had the beneficial effect that the fat in these fryers experienced less contamination during normal cooking and thus had an extended working life.

In U.S. Pat. No. 4,041,852 issued Aug. 16, 1977 to Richard T. Keating, problems in minimizing the amount of working fat in a deep fat fryer are addressed. The solution propounded in the patent is to provide a plurality of removable fat displacers to minimize the volume of fat in the vessel for cooking food products having surface to volume ratios less than that normally characteristic of small cut French fries. The purpose was to dispense with the need for having to change fat because it becomes contaminated and unfit to produce quality foods. The instant recovery fryer, with fat displacers to minimize the amount of fat, resulted in the undesirable free fatty acids being kept within acceptable limits by the periodic addition of make-up fat to replace the fat absorbed during cooking.

The technique taught in the patent involved the insertion of appropriately contoured fat displacement elements of extruded aluminum in various positions around the heat transfer tubes in the heating section of the vessel and around the food baskets in the cooking section of the vessel. The fat displacers were removable because of the need to periodically clean the fryer to remove crumbs and food particles that may have settled on the upper surfaces of the heat transfer tubes and on the bottom of the vessel. This requirement imposed a substantial burden on the operator and the system has not found wide acceptance in the food service industry.

Accordingly there still exists a need in the art for a deep fat fryer capable of the high heat exchange necessary for cooking foods having large heat input requirements in vessels of minimum surface area and volume for maximizing the working life and quality of the cooking fat.

OBJECTS OF THE INVENTION

A principal object of this invention is to provide a novel deep fat fryer.

Another object of this invention is to provide an instant recovery deep fat fryer having a minimum amount of cooking fat exposed to the atmosphere.

A further object of this invention is to provide a deep fat fryer that enhances the quality and working life of cooking fat.

SUMMARY OF THE INVENTION

In accordance with the invention, a deep fat fryer includes a vessel having a cooking section located above a heating section. The heating section includes a plurality of heat exchange tubes extending therethrough and is of longer dimension than the cooking section to provide a large heat exchange tube surface area for the fat in the heating section with a minimal surface exposure of cooking fat in the cooking section.

BRIEF DESCRIPTION OF THE DRAWINGS

Further objects and advantages of the invention will be apparent by reading the following description in conjunction with the drawings in which.

DESCRIPTION OF THE PREFERRED EMBODIMENT

Figure 1:
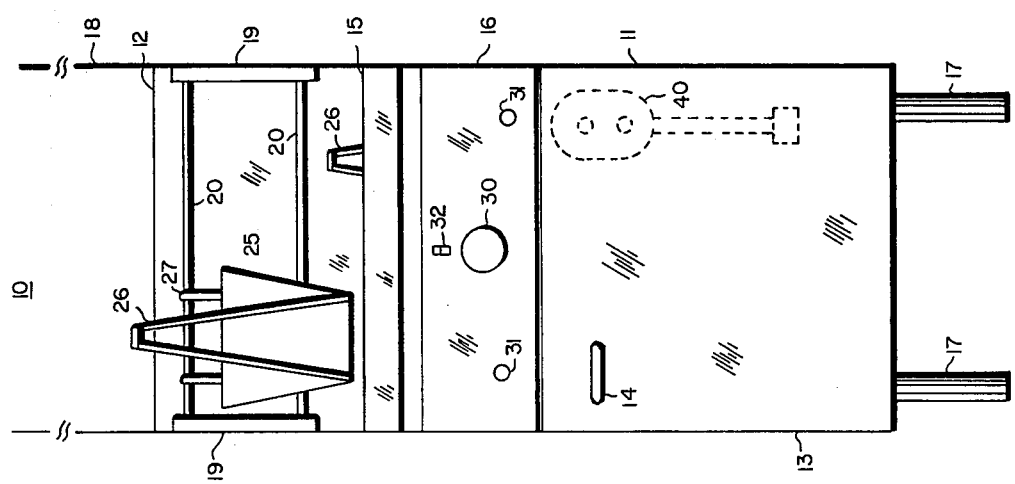
FIG. 1 is a front elevation of a three burner deep fat fryer with one burner shown in phantom view.

Referring to FIG. 1, a fryer 10 includes a cabinet 11 having a back panel 12, a door 13 including a handle 14, and a working ledge 15. A control panel 16, positioned intermediate ledge 15 and door 13, includes a control knob 30 for controlling the temperature-time cycle of the fryer. A pair of pilot lights 31 indicate the fryer temperature and operating conditions and a switch 32 controls operation of the heating cycle. Legs 17 support fryer 10 a suitable distance above the floor to facilitate frequent cleaning thereunder as is required in food establishments. A pair of rack ends 19 are mounted to back panel 12 and a pair of support rods 20 extend between them for supporting food baskets 25. The food baskets have handles 26 and support hooks 27 and may be supported on support rods 20, either when in an unused position or when holding foods preparatory to cooking or draining foods immediately after cooking. A flue 18 is positioned behind back panel 12, as best seen in FIG. 2.

Figure 2:
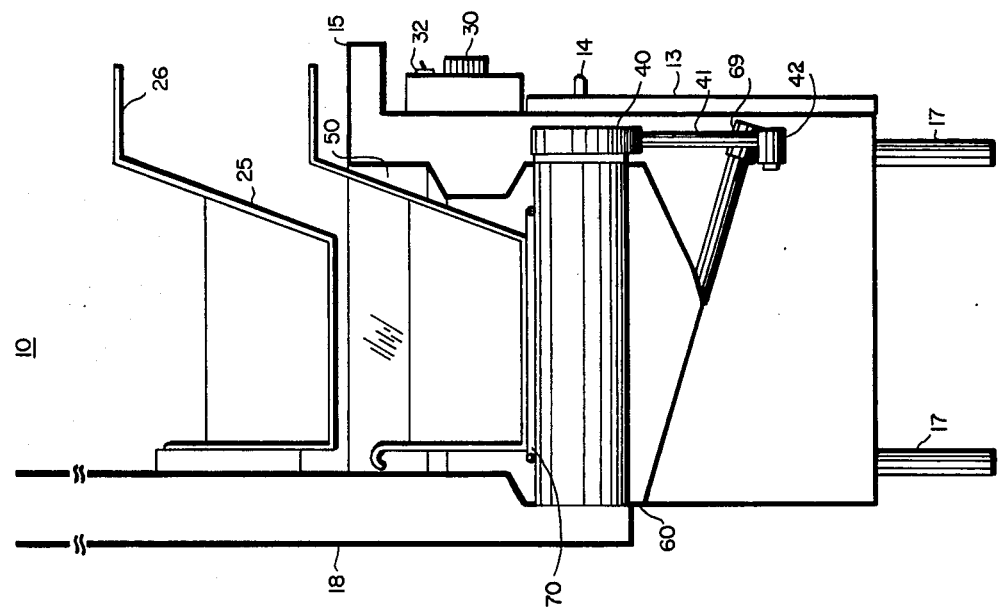
FIG. 2 is a cross section of the fryer of FIG. 1 showing the arrangement of the cooking vessel therein.

FIG. 2 represents a cross section of fryer 10 with the sectional portions being shown in heavy outline as the panels are too thin for conventional cross hatching. The construction details of the cooking vessel or pot 50 will be described fully in connection with FIGS. 3-5, and it will be sufficient to note here that the vessel includes three heat exchange tubes 60 (only one of which is visible in this view) extending the depth thereof and has front and rear extensions which render the lower, heating section of the vessel larger than its upper, cooking section. The arrangement of the vessel within the housing of the fryer is clearly indicated. Three burners 40 are positioned at the end of respective ones of heat exchange tubes 60 and are coupled in respective gas/air pipes 41 which in turn are supplied from suitable air valves 42. A manifold tube for the gas, the line connecting the fryer to the source of gas, and the gas regulating equipment are all omitted for clarity. The gas/air mixtures emanating from burners 40 are burned, with the combustion products traveling down the heat exchange tubes from right to left and continuing up flue 18 to a suitable exhaust. A wire rack 70 is positioned across the upper surfaces of heat exchanger tubes 60 to support food baskets 25 during cooking.

Figure 3:
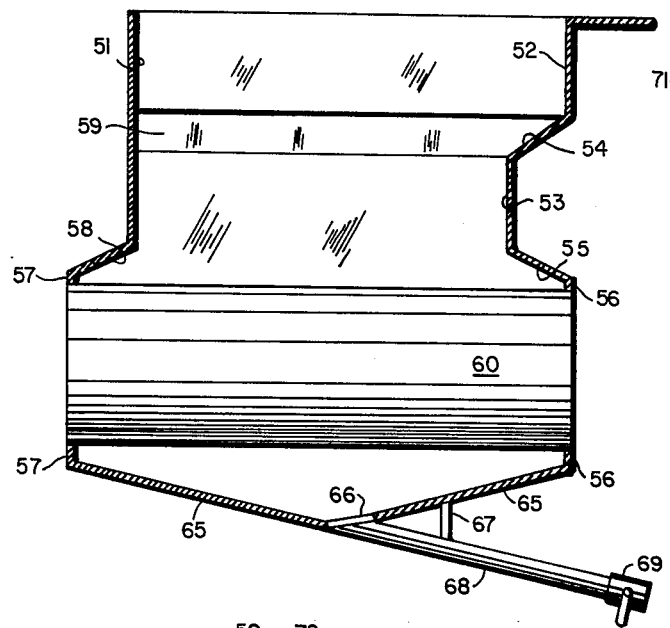
FIG. 3 is an enlarged cross section of the cooking vessel of the fryer of FIG. 2.
Figure 4:
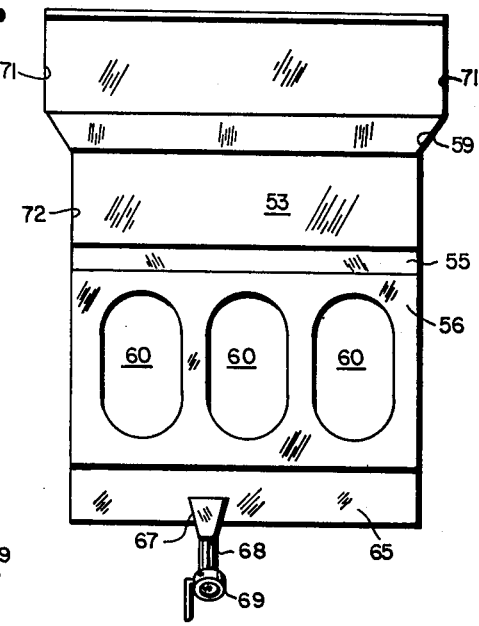
FIG. 4 is a front view of the cooking vessel of FIG. 3.
Figure 5:
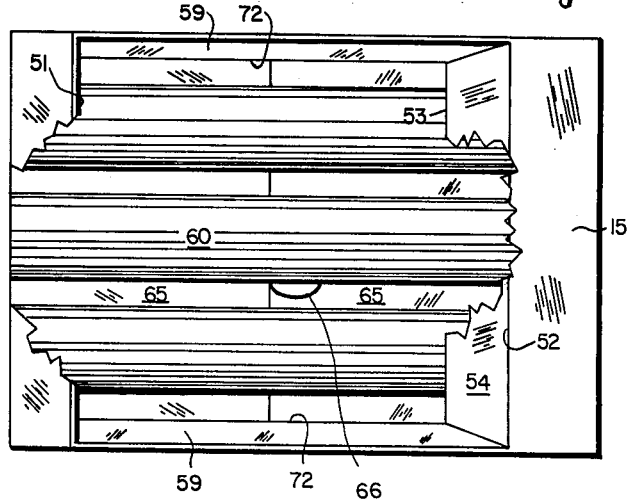
FIG. 5 is a top view of the cooking vessel of FIG. 3.

Referring to FIGS. 3–5, the enlarged cross sectional view of vessel 50 illustrates more clearly the arrangement of heat exchange tubes 60 and the extended front and rear portions of the vessel. Cooking vessel 50 includes a generally vertical upper rear wall 51 and a much shorter vertical upper front wall 52 which flows into an inwardly directed, top inclined portion 54 and to another generally vertical middle front wall 53. An outwardly directed, inclined front extension 55 is connected with wall 53 and extends to an apertured vertical lower front wall 56. A matching, apertured vertical lower rear wall 57 is similarly connected by an inclined rear extension 58 to upper rear wall 51. The bottoms of walls 56 and 57 are formed into inclined or tapered bottom sections 65 and a drain 66 is formed adjacent their juncture, which is the lowest portion of vessel 50. A drain pipe 58, leading to a drain valve 69, is welded to the tapered bottom sections 65 and is further supported by a support member 67 attached between it and an adjacent portion of the vessel bottom.

The heat exchange tubes are generally oval in cross section and their ends are peripherally welded to suitable apertures in lower walls 56 and 57 to form a seal capable of withstanding the temperatures to which the flames and combustion products subject them. The upper part of vessel 50 has upper vertical left and right side walls 71 connected to more clearly spaced vertical lower side walls 72 by tapered sections 59.

The horizontal cross sectional area of the cooking vessel just below tapered sections 59 is the surface area of the cooking fat that is exposed to the atmosphere and is seen to be substantially smaller than the horizontal cross sectional area of vessel 50 just above heat exchange tubes 60. The upper, small area, section is the cooking section and the lower, large area, section is the heating section. Deterioration of fat due to exposure to air is reduced without affecting the heat transfer to the cooking fat because the heat exchange surface area of heat exchange tubes 60 has not been decreased.

It will be apparent that the invention retains a high heat input capability with minimum exposed fat in a vessel that doesn't require replaceable parts and which is easily cleaned as required for restaurant operations. While not part of the invention, the shape of heat exchange tubes 60 is conductive for "shedding off" dislodged food particles, especially during heating cycles when rapid flow of liquified fat around the heat exchange tube surfaces occurs. As in prior art designs, the heat exchange tubes are positioned above the bottom of the vessel to form a "cool" zone beneath them for dislodged food particles and the like. The particles resting on the bottom are thus subjected to lower temperatures and are therefore much slower to form carbonaceous material, which as is well known, is a major contributor to accelerated fat deterioration and its consequent unsuitability for producing quality cooked food.

As mentioned, the normal level of cooking fat in the fryer is maintained at the bottom of tapered sections 59 or the point of smallest exposed cross sectional area of the vessel. Thus, when the fryer is in the standby mode, a minimum amount of cooking fat is exposed to the atmosphere, thus minimizing fat deterioration from this cause. The inclined extensions assist is circulation of heated fat from the tube surfaces in the heating section to the cooking section.

It is thus seen that with the invention the benefits of the above mentioned patent are attained without the disadvantages thereof. It is recognized that numerous modifications in the described embodiment of the invention will be apparent to those skilled in the art without departing from the true spirit and scope thereof. The invention is to be limited only as defined in the claims.

What is claimed is:

1. A deep fat fryer, comprising:
    a cooking vessel formed by continuous, permanent wall means comprising a front wall, a rear wall and two side walls for containing fat and defining an upper cooking section and a lower heat exchange section;
    heat exchange means disposed in said lower heat exchange section;
    means for supporting food in said upper cooking section above said heat exchange means;
    the cross-sectional dimensions of said upper cooking section defining the surface area of said fat exposed to atmosphere; and
    the cross-sectional dimensions of said lower heat exchange section surrounding said heat exchange means being significantly larger than the cross-sectional dimensions of said upper cooking section.

2. A deep fat fryer as set forth in claim 1 wherein said heat exchange means comprises heat exchange tubes that extend through said heating section and extend beyond the boundary of the walls of said cooking section.

3. A deep fat fryer as set forth in claim 2 wherein said heat exchange tubes extend from the front wall to the rear wall of said heating section and wherein said front wall and said rear wall define apertures in which said heat exchange tubes are positioned.

4. A deep fat fryer as set forth in claim 3 wherein said vessel includes front and rear walls in said cooking section which are closer together than said front and rear walls in said heating section, and further including inclined extensions joining both sets of front and rear walls, respectively.

5. An instant recovery deep fat fryer of minimal surface area for rapidly cooking foods having high heat input requirements with minimal fat deterioration due to atmospheric exposure, comprising:
    a cooking vessel formed by continuous, permanent wall means for containing fat and defining an upper cooking section and a lower heat exchange section;
    a plurality of heat exchange tubes coupled to atmospheric combustion burners, said tubes being positioned in said lower heat exchange section;
    the cross-sectional dimensions of said upper cooking section defining the surface are of said fat exposed to atmosphere; and
    the cross-sectional dimensions of said lower heat exchange section surrounding said heat exchange tubes being significantly larger than the cross-sectional dimensions of said upper cooking section.

\* \* \* \* \*